United States Patent
Price et al.

(10) Patent No.: US 9,988,179 B2
(45) Date of Patent: *Jun. 5, 2018

(54) CONTAINER WITH THERMALLY FUSED DOUBLE-SEAMED OR CRIMP-SEAMED METAL END

(71) Applicant: SONOCO DEVELOPMENT, INC., Hartsville, SC (US)

(72) Inventors: Trevor Price, North Canton, OH (US); Jeremy Morin, Canal Fulton, OH (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/698,143

(22) Filed: Sep. 7, 2017

(65) Prior Publication Data

US 2017/0369201 A1    Dec. 28, 2017

Related U.S. Application Data

(60) Division of application No. 15/271,846, filed on Sep. 21, 2016, now Pat. No. 9,783,337, which is a division (Continued)

(51) Int. Cl.
*B65D 8/00* (2006.01)
*A23B 7/005* (2006.01)
(Continued)

(52) U.S. Cl.
CPC .............. *B65D 15/24* (2013.01); *A23B 7/005* (2013.01); *A23B 7/0056* (2013.01); *A23L 3/00* (2013.01);
(Continued)

(58) Field of Classification Search
CPC ..... A23L 3/02; A23L 3/10; A23L 3/00; A23B 7/0056; A23B 7/005; B65D 15/24;
(Continued)

(56) References Cited

U.S. PATENT DOCUMENTS 2,828,903 A    4/1958    Adkins
3,073,478 A    1/1963    Henchert
(Continued)

FOREIGN PATENT DOCUMENTS

CA    2 489 218 A1    7/2005
CH    422 690    10/1996
(Continued)

OTHER PUBLICATIONS eLIBRARY.RU—Advances in fusion bonding techniques for joining thermoplastic matri . . . [online] [retrieved Jan. 14, 2011]. Retrieved from the Internet <URL: http://elibrary.ru/item.asp?id=585705>. 1 page.

(Continued)

*Primary Examiner* — Erik Kashnikow
*Assistant Examiner* — Chaim A Smith
(74) *Attorney, Agent, or Firm* — Nelson Mullins Riley & Scarborough, LLP (57) ABSTRACT

A container includes a metal end applied and sealed to an all-thermoplastic container body by a crimp-seaming or double-seaming operation. The metal end has an outer curl joined to a chuck wall that extends down from the curl. One or both of the inner surface of the container side wall and the outer surface of the chuck wall has/have a heat-sealable material thereon. The metal end is crimp-seamed or double-seamed to the container body and the heat-sealable material (s) are heated to soften or melt such that the interface between the chuck wall and the side wall is fused. The interface is oriented along a direction relative to internal pressure exerted on the metal end such that stress on the interface caused by the internal pressure is predominantly shear stress.

11 Claims, 7 Drawing Sheets

Related U.S. Application Data of application No. 14/638,420, filed on Mar. 4, 2015, now Pat. No. 9,499,299, which is a continuation of application No. 13/224,651, filed on Sep. 2, 2011, now Pat. No. 8,998,027.

(51) Int. Cl.

| | | |
|---|---|---|
| *A23L 3/10* | (2006.01) | |
| *A23L 3/02* | (2006.01) | |
| *A23L 3/00* | (2006.01) | |
| *B65B 7/28* | (2006.01) | |
| *B65B 3/02* | (2006.01) | |
| *B65B 55/02* | (2006.01) | |
| *B65B 25/00* | (2006.01) | |

(52) U.S. Cl.
CPC ........ *A23L 3/02* (2013.01); *A23L 3/10* (2013.01); *B65B 3/02* (2013.01); *B65B 7/28* (2013.01); *B65B 7/285* (2013.01); *B65B 7/2878* (2013.01); *B65B 25/001* (2013.01); *B65B 55/02* (2013.01); *B65D 15/18* (2013.01)

(58) Field of Classification Search
CPC .. B65D 15/18; B65B 3/02; B65B 7/28; B65B 7/2878; B65B 7/285; B65B 25/001; B65B 55/02

See application file for complete search history.

(56) References Cited

U.S. PATENT DOCUMENTS

| | | |
|---|---|---|
| 3,405,439 A | 10/1968 | Uemura |
| 3,406,891 A | 10/1968 | Buchner et al. |
| 3,549,440 A | 12/1970 | Adcock et al. |
| 3,616,047 A | 10/1971 | Kehe |
| 3,625,785 A | 12/1971 | Holmstrom et al. |
| 3,694,609 A | 9/1972 | Kennedy |
| 3,774,801 A | 11/1973 | Gedde |
| 3,843,014 A | 10/1974 | Cospen et al. |
| 3,868,917 A | 3/1975 | Arfert |
| 3,909,326 A | 9/1975 | Renck |
| 3,912,154 A | 10/1975 | Godar |
| 3,934,749 A | 1/1976 | Andrulionis |
| 3,978,232 A | 8/1976 | Dodsworth et al. |
| 3,988,185 A | 10/1976 | Johnson et al. |
| 4,093,102 A | 6/1978 | Kraska |
| 4,095,390 A | 6/1978 | Knudsen |
| 4,217,843 A | 8/1980 | Kraska |
| 4,241,864 A | 12/1980 | Kessler |
| 4,428,741 A | 1/1984 | Westphal |
| 4,448,322 A | 5/1984 | Kraska |
| 4,530,442 A | 7/1985 | Vogel, Jr. et al. |
| 4,538,758 A | 9/1985 | Griffith |
| 4,588,621 A | 5/1986 | Bunel et al. |
| 4,606,472 A | 8/1986 | Taube et al. |
| 4,626,157 A | 12/1986 | Franek et al. |
| 4,643,330 A | 2/1987 | Kennedy |
| 4,667,842 A | 5/1987 | Collins |
| 4,674,649 A | 6/1987 | Pavely |
| 4,711,362 A | 12/1987 | Korcz et al. |
| 4,716,755 A | 1/1988 | Bulso, Jr. et al. |
| 4,735,339 A | 4/1988 | Benge et al. |
| 4,758,704 A | 7/1988 | Kogel |
| 4,808,052 A | 2/1989 | Bulso, Jr. et al. |
| 4,809,861 A | 3/1989 | Wilkinson et al. |
| 4,890,759 A | 1/1990 | Scanga et al. |
| 4,891,484 A | 1/1990 | Waggott et al. |
| 4,940,158 A | 7/1990 | Farrell et al. |
| 4,941,306 A | 7/1990 | Pfaffmann et al. |
| 4,948,006 A | 8/1990 | Okabe et al. |
| 4,991,735 A | 2/1991 | Biondich |
| 5,025,123 A | 6/1991 | Pfaffmann et al. |
| 5,025,124 A | 6/1991 | Alfredeen |
| 5,046,637 A | 9/1991 | Kysh |
| 5,053,593 A | 10/1991 | Iguchi |
| 5,069,355 A | 12/1991 | Matuszak |
| 5,071,029 A | 12/1991 | Umlah et al. |
| 5,249,701 A | 10/1993 | Daehn |
| 5,257,709 A | 11/1993 | Okabe et al. |
| 5,331,127 A | 7/1994 | Chen |
| 5,360,498 A | 11/1994 | Blomqvist et al. |
| 5,501,362 A | 3/1996 | Cudzik |
| 5,562,799 A | 10/1996 | Ross et al. |
| 5,590,807 A | 1/1997 | Forrest et al. |
| 5,598,734 A | 2/1997 | Forrest et al. |
| 5,721,028 A | 2/1998 | Suzuki et al. |
| 5,847,370 A | 12/1998 | Sluka et al. |
| 5,858,141 A | 1/1999 | Repp et al. |
| 5,971,259 A | 10/1999 | Bacon |
| 5,977,527 A | 11/1999 | Preston et al. |
| 6,043,471 A | 3/2000 | Wiseman et al. |
| 6,078,033 A | 6/2000 | Bowers et al. |
| 6,079,185 A | 6/2000 | Palaniappan et al. |
| 6,102,243 A | 8/2000 | Fields et al. |
| 6,104,013 A | 8/2000 | Miller |
| 6,116,500 A | 9/2000 | Cahill |
| 6,194,041 B1 | 2/2001 | McHenry et al. |
| 6,262,402 B1 | 7/2001 | Isoyama et al. |
| 6,408,498 B1 | 6/2002 | Fields et al. |
| 6,412,252 B1 | 7/2002 | Sarles et al. |
| 6,419,110 B1 | 7/2002 | Stodd |
| 6,460,723 B2 | 10/2002 | Nguyen et al. |
| 6,477,823 B1 | 11/2002 | Kitterman et al. |
| 6,499,622 B1 | 12/2002 | Neiner |
| 6,516,968 B2 | 2/2003 | Stodd |
| 6,555,801 B1 | 4/2003 | LeMieux et al. |
| 6,629,399 B2 | 10/2003 | Sarles et al. |
| 6,702,142 B2 | 3/2004 | Neiner |
| 6,725,630 B2 | 4/2004 | Rea et al. |
| 6,732,495 B2 | 5/2004 | Sarles et al. |
| 6,736,283 B1 | 5/2004 | Santamaria et al. |
| 6,747,252 B2 | 6/2004 | Herzog |
| 6,875,965 B2 | 4/2005 | Herzog |
| 6,915,553 B2 | 7/2005 | Turner et al. |
| 6,964,796 B1 | 11/2005 | Koyama et al. |
| 7,065,941 B2 | 6/2006 | Sarles et al. |
| 7,100,789 B2 | 9/2006 | Nguyen et al. |
| 7,119,310 B2 | 10/2006 | Hammen et al. |
| 7,137,524 B2 | 11/2006 | Nomula |
| 7,174,762 B2 | 2/2007 | Turner et al. |
| 7,318,536 B2 | 1/2008 | Maravich et al. |
| 7,341,163 B2 | 3/2008 | Stodd |
| 7,370,774 B2 | 5/2008 | Watson et al. |
| 7,380,684 B2 | 6/2008 | Reed et al. |
| 7,484,639 B2 | 2/2009 | Maravich et al. |
| 7,591,392 B2 | 9/2009 | Watson et al. |
| 7,772,518 B2 | 8/2010 | Rajesh et al. |
| 8,360,125 B2 | 1/2013 | Schwiese et al. |
| 8,939,695 B2 | 1/2015 | Price et al. |
| 8,998,027 B2 | 4/2015 | Price et al. |
| 9,499,299 B2 | 11/2016 | Price et al. |
| 9,783,337 B2 | 10/2017 | Price et al. |
| 2001/0032839 A1 | 10/2001 | Herzog |
| 2003/0089079 A1 | 5/2003 | Rea et al. |
| 2005/0029269 A1 | 2/2005 | Stodd et al. |
| 2005/0252918 A1 | 11/2005 | McKnight et al. |
| 2006/0071005 A1 | 4/2006 | Bulso |
| 2006/0186127 A1 | 8/2006 | Rajesh et al. |
| 2006/0191940 A1 | 8/2006 | Heyn |
| 2007/0095847 A1 | 5/2007 | Gruver et al. |
| 2007/0187352 A1 | 8/2007 | Kras et al. |
| 2008/0041867 A1 | 2/2008 | Jochem et al. |
| 2008/0050207 A1 | 2/2008 | Turner et al. |
| 2008/0078766 A1 | 4/2008 | Oberholzer |
| 2008/0216960 A1 | 9/2008 | Schwiese et al. |
| 2009/0020543 A1 | 1/2009 | Bulso |
| 2009/0230079 A1 | 9/2009 | Smolko |
| 2009/0257847 A1 | 10/2009 | Schumann et al. |
| 2009/0269169 A1 | 10/2009 | Turner et al. |
| 2010/0006532 A1 | 1/2010 | Lee |
| 2010/0006571 A1 | 1/2010 | Shibasaka et al. |
| 2010/0038365 A1 | 2/2010 | Ishida et al. |
| 2010/0176134 A1 | 7/2010 | Cramer |

(56) References Cited

U.S. PATENT DOCUMENTS

| | | | |
|---|---|---|---|
| 2011/0095030 | A1 | 4/2011 | Dunn et al. |
| 2011/0226787 | A1 | 9/2011 | Yourist |
| 2012/0321415 | A1 | 12/2012 | Price et al. |
| 2013/0059048 | A1 | 3/2013 | Price et al. |
| 2013/0105467 | A1 | 5/2013 | Morin et al. |
| 2013/0272820 | A1 | 10/2013 | Price et al. |

FOREIGN PATENT DOCUMENTS

| | | | |
|---|---|---|---|
| CN | 2143601 | Y | 10/1993 |
| CN | 1230154 | A | 9/1999 |
| CN | 2723366 | Y | 9/2005 |
| EP | 0 099 159 | A2 | 1/1984 |
| EP | 0 420 519 | A1 | 4/1991 |
| EP | 0 742 152 | A1 | 11/1996 |
| GB | 1 078 696 | | 8/1967 |
| GB | 1 207 306 | | 9/1970 |
| GB | 2 051 627 | A | 1/1981 |
| GB | 2 067 158 | A | 7/1981 |
| GB | 2 384 478 | A | 7/2003 |
| JP | 8-151041 | A | 6/1996 |
| RU | 2202502 | C2 | 4/2003 |
| WO | WO 95/34469 | A1 | 12/1995 |
| WO | WO 96/37414 | A1 | 11/1996 |
| WO | WO 2006/050465 | A1 | 5/2006 |
| WO | WO 2007/014211 | A1 | 2/2007 |
| WO | WO 2011/053451 | A1 | 5/2011 |
| WO | WO 2013/033343 | A1 | 3/2013 |
| WO | WO 2013/063063 | A1 | 5/2013 |
| WO | WO/2013/154908 | A1 | 10/2013 |

OTHER PUBLICATIONS

International Search Report for Application No. PCT/US2012/061615; dated Feb. 6, 2013.
International Preliminary Report on Patentability/Written Opinion for Application No. PCT/US2012/061615 dated Apr. 29, 2014.
International Search Report/Written Opinion for Application No. PCT/US2012/053062 dated Nov. 5, 2012.
International Preliminary Report on Patentability for Application No. PCT/US2012/053062 dated Mar. 4, 2014.
International Search Report and Written Opinion for Application No. PCT/US2013/035283 dated Jun. 25, 2013.
Office Action for Canadian Patent Application No. 2,847,432 dated Nov. 25, 2014.
Office Action for Chinese Patent Application No. 201280053353.7 dated Mar. 24, 2015.
Office Action for Chinese Patent Application No. 201280053353.7 dated Jun. 3, 2015.
Notice of Allowance for Russian Application No. 2014110102/12 dated Aug. 24, 2015.
Notice of Allowance for Canadian Application No. 2,847,432 dated Sep. 3, 2015.
Office Action for Chinese Patent Application No. 201280053353.7 dated Dec. 11, 2015.
Substantive Examination Report for Philippines Patent Application No. 1/2014/500469 dated Mar. 17, 2016, 2 pages.
Notice of Allowance for Chinese Application No. 201280053353.7 dated Apr. 26, 2016.
Notice of Allowance for Mexican Application No. MX/A/2014/002455 dated May 6, 2016.
Office Action for Canadian Application No. 8,870,266 dated Jul. 27, 2016.
Office Action from Canadian Application No. 2,871,266 dated Feb. 22, 2017.
Rule 71(3) Communication, Notice fo Allowanace for European Patent Application No. 12 759 313.5 dated Sep. 9, 2016, 6 pages.
Office Action for U.S. Appl. No. 13/161,713 dated Mar. 3, 2014.
Office Action for U.S. Appl. No. 13/224,651 dated Mar. 28, 2014.
Office Action for U.S. Appl. No. 13/224,651 dated Jul. 10, 2014.
Office Action for U.S. Appl. No. 13/284,056 dated Jul. 31, 2014.
Notice of Allowance for U.S. Appl. No. 13/161,713 dated Sep. 18, 2014, 14 pages.
Notice of Allowance for U.S. Appl. No. 13/224,651 dated Dec. 5, 2014.
Office Action for U.S. Appl. No. 13/445,162 dated Jan. 23, 2015, 28 pages.
Office Action for U.S. Appl. No. 13/284,056 dated Apr. 1, 2015, 18 pages.
Office Action for U.S. Appl. No. 13/445,162 dated Mar. 11, 2015, 17 pages.
Office Action for U.S. Appl. No. 13/445,162 dated Aug. 11, 2016, 25 pages.
Office Action for U.S. Appl. No. 14/638,420 dated Apr. 26, 2016.
Notice of Allowance for U.S. Appl. No. 14/638,420 dated Jul. 22, 2016.
Office Action for U.S. Appl. No. 13/445,162 dated Aug. 11, 2016.
Advisory Action for U.S. Appl. No. 13/445,162 dated Oct. 17, 2016, 4 pages.
Office Action for Chinese Patent Application 201610462899.8, dated Jan. 22, 2018, all pages enclosed cited.
Office Action from U.S. Appl. No. 13/445,162, dated Feb. 1, 2018, all pages.

CONTAINER WITH THERMALLY FUSED DOUBLE-SEAMED OR CRIMP-SEAMED METAL END

CROSS-REFERENCE TO RELATED APPLICATIONS

This application is a divisional of U.S. patent application Ser. No. 15/271,846, filed Sep. 21, 2016, which is a divisional of U.S. patent application Ser. No. 14/638,420, filed Mar. 4, 2015, which is a continuation of U.S. patent application Ser. No. 13/224,651, filed Sep. 2, 2011, each of which is hereby incorporated by reference in its entirety.

BACKGROUND OF THE INVENTION

The present disclosure relates to containers, particularly to containers having one or two metal ends applied to one or both ends of the container body and crimp-seamed or double-seamed onto the container body, and most particularly to such containers used for retort processing and in which the container body is formed substantially of thermoplastic.

Traditionally, retort containers have been constructed substantially of metal. For many decades the standard retort food containers have been three-piece or two-piece metal cans. In a three-piece metal can, a metal can body is closed by a pair of metal ends that are typically double-seamed onto the ends of the can body. A two-piece metal can eliminates one of the metal ends because the can body is a deep-drawn body with an integral bottom wall. The metal ends of such typical retort containers have an outer peripheral portion funning a "curl" that receives the end of the can body, and after the end is applied the curl and the wall of the can body are rolled up together to form a double seam. This construction has the great advantage that it readily withstands retort processing without the seams being compromised, because the plastically deformed metal of the can body in the seam area tends to hold its deformed shape despite the high pressure and temperature during retort.

More recently there has been a desire to construct retort containers that use less metal, motivated by the potential cost reduction and improved aesthetics that such a construction can offer. The development described in the present disclosure at least in some aspects is aimed at addressing this desire.

BRIEF SUMMARY OF THE INVENTION

In particular, the present disclosure describes a retort container having one or two metal ends attached to a substantially thermoplastic container body in such a way that there is an improvement in blow-off resistance when the inside of the container is pressurized relative to outside ambient pressure for any reason (e.g., during retort processing, or as a result of changes in altitude of the container, such as when a container is filled and sealed at sea level and is subsequently transported to a high-altitude location).

In accordance with the invention in one embodiment, a retort container comprises:

a container body constructed substantially of thermoplastic and having a side wall extending about a container body axis, the side wall having a lower end and an upper end, the upper end defining an upper edge that extends about a top opening of the container body, the side wall having an inner surface and an outer surface;

a metal end closing the top opening of the container body, the metal end having at least a metal layer and comprising a central portion and an outer peripheral portion extending generally radially outwardly from the central portion and extending circumferentially about the central portion, the peripheral portion having a radially outer part and a radially inner part, a first heat-sealable material being present on at least one of (a) a lower surface of at least the peripheral portion of the metal end and (b) the inner surface of the side wall adjacent the upper end thereof, the radially outer part of the peripheral portion defining a curl, the radially inner part of the peripheral portion defining a chuck wall that extends generally downward from the curl and has a radially outer surface forming an interface with the inner surface of the side wall of the container body;

a seam connecting the metal end to the upper end of the side wall, the seam having the curl of the metal end and the upper end of the side wall interlocked; and the interface between the chuck wall and the side wall being fused by heat-sealing of the first heat-sealable material between the radially outer surface of the chuck wall and the inner surface of the side wall, the interface being oriented along a direction such that stress on the interface caused by internal pressure inside the container exerted on the metal end is predominantly shear stress.

The retort container in accordance with a further embodiment can include a second heat-sealable material present on the other of (a) the lower surface of at least the peripheral portion of the metal end and (b) the inner surface of the side wall adjacent the upper end thereof. In this embodiment, the second heat-sealable material and the first heat-sealable material are in contact with each other and are thermally fused together such that the interface between the chuck wall and the side wall is fused. Advantageously, but not essentially, the second heat-sealable material and the first heat-sealable material are thermally fused together in the seam as well.

Heat-sealable materials useful in the practice of the present invention can comprise any known heat-sealable materials. The metal end can have an interior coating, and optionally an exterior coating as well.

The seam between the metal end and the side wall can be a crimp seam or a double seam. In the case of a double seam, the upper end of the side wall forms a body hook and the curl of the metal end forms an end hook interlocked with the body hook.

The container body can be made and configured in various ways. For example, the container body can be a blow-molded, thermoformed, or injection-molded container body having a bottom wall integrally joined to the side wall. Alternatively, the container body can be an extruded container body having an open lower end, in which case the lower end is closed by a second metal end similar to that closing the top end.

In some embodiments, the metal end is an easy-open end having a severable panel defined by a score line in the metal layer. Alternatively, the metal end can be a sanitary end, or the metal end can comprise a membrane sealed to an annular metal ring.

The present disclosure also describes methods for making containers. In one embodiment a method for making a container comprises the steps of:

providing a container body constructed substantially of thermoplastic and having a side wall extending about a container body axis, the side wall having a lower end and an upper end, the upper end defining an upper edge that extends about a top opening of the container body, the side wall having an inner surface and an outer surface;

providing a metal end for closing the top opening of the container body, the metal end having at least a metal layer and comprising a central portion and an outer peripheral portion extending generally radially outwardly from the central portion and extending circumferentially about the central portion, the peripheral portion having a radially outer part and a radially inner part, a first heat-sealable material being present on one of (a) a lower surface of at least the peripheral portion of the metal end and (b) the inner surface of the side wall adjacent the upper end thereof, the radially outer part of the peripheral portion defining a curl, the radially inner part of the peripheral portion defining a chuck wall that extends generally downward from the curl and has a radially outer surface;

applying the metal end to the container body such that the metal end closes the top opening and the radially outer surface of the chuck wall and the inner surface of the side wall have an intimately contacting interface therebetween;

forming a seam connecting the metal end to the upper end of the side wall, the seam being formed by interlocking the curl of the metal end with the upper end of the side wall;

after formation of the seam is completed, heating the first heat-sealable material to a temperature sufficient to cause the first heat-sealable material to be softened or melted and to wet the radially outer surface of the chuck wall and the inner surface of the side wall; and allowing the first heat-sealable material to cool and harden such that the interface between the chuck wall and the side wall is fused, the interface being oriented along a direction such that stress on the interface caused by internal pressure inside the container exerted on the metal end is predominantly shear stress.

The step of forming a seam can comprise forming a crimp seam, or it can comprise forming a double seam by rolling the curl of the metal end and the upper end of the side wall together so as to form the upper end of the side wall into a body hook and to form the curl into an end hook and to interlock the body hook and the end hook.

The heating step can be carried out in any of various ways, including heating by conduction, heating by induction, frictional heating, etc.

In some embodiments the method can further comprise providing a second heat-sealable material present on the other of (a) the lower surface of at least the peripheral portion of the metal end and (b) the inner surface of the side wall adjacent the upper end thereof. Thus, the metal end and the side wall both have respective heat-sealable materials thereon. The method entails placing the second heat-sealable material and the first heat-sealable material in contact with each other at the interface between the chuck wall and the side wall, and heating the first and second heat-sealable materials to a temperature sufficient to cause the first and second heat-sealable materials to be softened or melted and to flow together, after which cooling of the first and second heat-sealable materials is allowed to occur so as to fuse the chuck wall to the inner surface of the side wall.

The second heat-sealable material and the first heat-sealable material can be thermally fused together in the seam as well.

The container body can be made by various processes, including, for example, blow molding, thermoforming, or extrusion. In the case of a blow-molded or thermoformed container body, the container body includes a bottom wall integrally joined to the side wall. In the case of an extruded container body, the container body has an open lower end and therefore a second metal end is attached to the lower end. The second metal end and its attachment to the container body can be substantially identical to the first metal end and its attachment to the container body.

The method can further comprise the steps of filling the container with a food product prior to the step of applying the metal end to the container body, and, after the interface between the chuck wall and the side wall is fused, retorting the container. During the retorting step the thermoplastic container body is radially unconstrained such that the container body is allowed to expand radially as internal pressure is exerted on the side wall. Notably, the container body is free of any special expansion panels, whereby the radial expansion of the container body occurs substantially uniformly about a circumference of the container body.

In some embodiments, the chuck wall extends at a non-zero acute angle relative to a longitudinal axis of the container body and is configured such that a lower end of the chuck wall is smaller in diameter than the inner surface of the side wall, while an upper end of the chuck wall is larger in diameter than the inner surface of the side wall. The step of applying the metal end to the container body results in the side wall of the container body moving relatively upward from the lower end to the upper end of the chuck wall such that an interference fit is created between the chuck wall and the side wall, thereby creating the intimately contacting interface therebetween.

During the heating step there is a substantial absence of external pressure exerted on the chuck wall and side wall; rather, pressure between the chuck wall and side wall comes from the interference fit that already exists between them when the end is applied and seamed to the side wall. Thus, there is no need for sealing jaws to create pressure during the heating step in order to form a secure thermal bond between the metal end and the container body. Indeed, in some embodiments the heating step can be carried out with induction heating in which there can be an absence of contact between the induction tool and the metal end.

The present disclosure also describes a packaging and retorting process for packaging and sterilizing a food product. In one embodiment, a method for packaging and retort-processing a food product comprises the steps of:

providing a container assembly that includes a substantially thermoplastic container body having a side wall and further includes an end wall closing a lower end of the container body, an opposite upper end of the container body being open;

providing a metal end having at least a metal layer and comprising a central portion and an outer peripheral portion extending generally radially outwardly from the central portion and extending circumferentially about the central portion, the peripheral portion having a curl and a chuck wall that extends generally downward and radially inwardly from the curl;

providing at least one heat-sealable material on at least one of (a) a lower surface of the peripheral portion of the metal end and (b) an inner surface of the container body adjacent the upper end thereof;

placing the food product into the container assembly through the open end of the container body;

forming a crimp seam between the metal end onto the container body to close the open end thereof, the forming step causing the side wall of the container body to be compressed between the chuck wall on an inner side of the side wall and a permanently deformed portion of the metal end formed by deforming the curl on an outer side of the side wall;

thermally fusing the metal end to the container body by causing the heat-sealable material(s) to be melted where the metal end compresses the side wall and then allowing the melted heat-sealable material(s) to cool and harden, thereby completing a filled container; and retort-processing the filled container to sterilize the food product and interior of the container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The drawings are not necessarily to scale, and thus the relative proportions of various elements (e.g., thicknesses of layers in multi-layer structures) suggested by the drawings is not necessarily indicative of the actual relative proportions.

Figure 1:
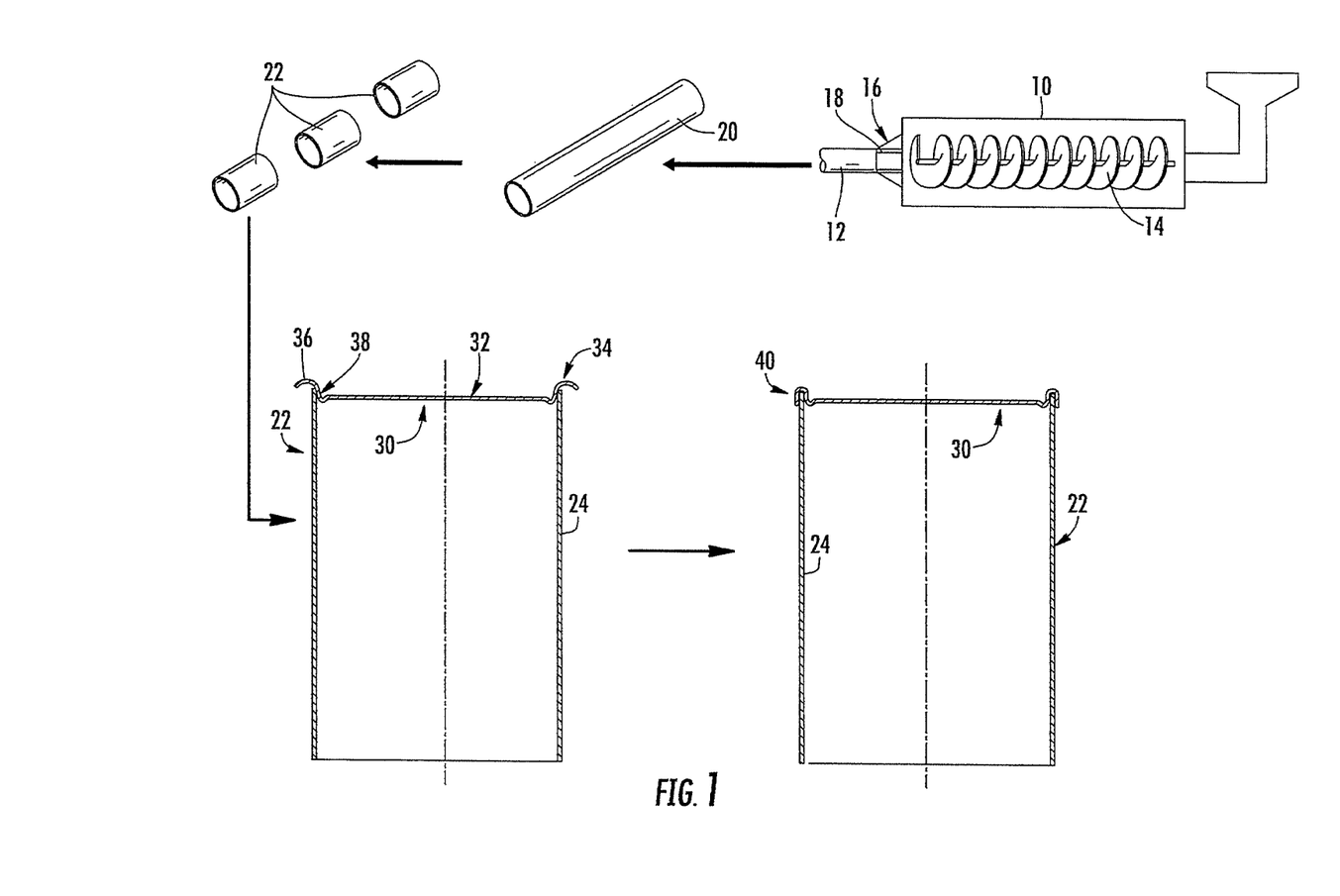
FIG. 1 is a diagrammatic depiction of several steps of a process for making containers in accordance with one embodiment of the invention.

With reference to FIG. 1, several steps of a process for making containers in accordance with an embodiment of the invention are schematically depicted. In a first step, an extruder 10 is employed to extrude a substantially thermoplastic tube 12 as a continuous extrusion. The extruder 10 includes a screw 14 or the like that feeds a molten substantially thermoplastic material under pressure through a die 16 such that the continuous tube 12 is extruded through an annular die orifice 18. The extruded tube 12 can have a monolayer or multi-layer construction. As an example of a multi-layer construction, the tube wall can have the structure (from ID to OD): heat-sealable layer/tie layer/barrier layer/tie layer/heat-sealable layer.

The continuously extruded tube 12 is cooled sufficiently (via known cooling means, not illustrated) and is then cut into parent tubes 20 of a convenient length. Typically each parent tube 20 will be of sufficient length to provide a plurality of container bodies 22 cut from the parent tube as shown. Each container body 22 is then mated with a pair of metal ends 30.

The metal end 30 and container body 22 in some embodiments can be constructed to mate with each other as described in Applicant's co-pending application Ser. No. 13/161,713 filed on Jun. 16, 2011, the entire disclosure of which is hereby incorporated herein by reference.

The metal end 30 includes a central portion 32 and an outer peripheral portion 34 extending generally radially outwardly from the central portion 32 and extending circumferentially about the central portion 32. The peripheral portion 34 has a radially outer part and a radially inner part. The radially outer part defines a curl 36 having a lower surface that is generally concave downward in an axial direction of the metal end. The radially inner part defines a chuck wall 38 that extends generally downward and radially inward from the curl 36. The chuck wall 38 can be a compound-angle chuck wall, as described in the above-noted '713 application, having an upper part adjacent the curl 36 and a lower part joined to and positioned below the upper part. The upper part of the chuck wall is substantially linear and oriented relative to the axial direction at a relatively smaller non-zero angle and the lower part of the chuck wall is substantially linear and oriented relative to the axial direction at a relatively larger angle compared to the upper part of the chuck wall.

The metal end 30 is configured such that at least a bottom edge of the lower part of the chuck wall has an outside diameter that is smaller than the inside diameter of the container body side wall 24 at the upper edge thereof. Additionally, the chuck wall 38 is configured such that it becomes somewhat larger in diameter than the inside diameter of the container body side wall 24 as the top edge of the side wall progresses up toward the curl 36 during mate-up of the metal end 30 with the container body 22. In other words, the side wall's ID is undersized in relation to the OD of the chuck wall adjacent the curl. This has the effect of "wiping" the inner surface of the side wall 24 with the metal end during mate-up, which has the benefit of cleaning the inner surface prior to seaming. This also results in an interference fit between the chuck wall 38 and the side wall 24.

Figure 2:
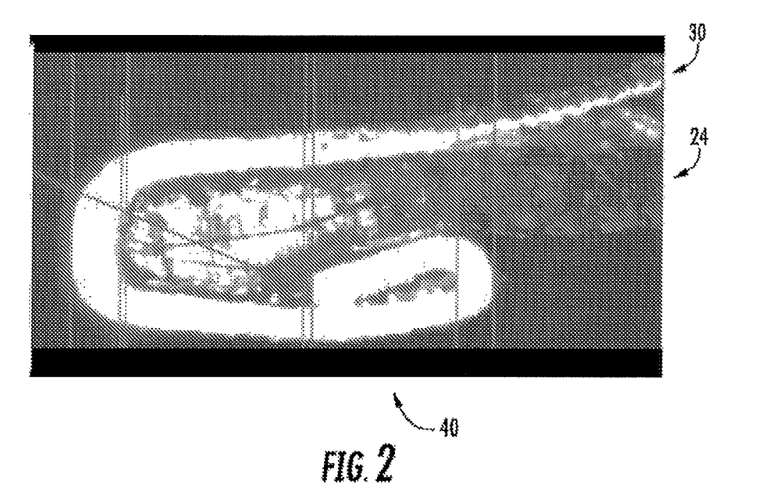
FIG. 2 is a photomicrograph of a sectioned container in the region of the metal end's seam with the container body, in accordance with an embodiment of the invention.

Once the metal end 30 is mated with the container body 22, a seaming operation is performed in order to seam the metal end onto the container body. In the illustrated embodiment, the container body is a straight-walled (non-flanged) container body, and a crimp seam 40 is formed between the metal end and the container body, in which the side wall 24 remains substantially straight and is compressed between the chuck wall 38 and a deformed portion of the curl 36. Alternatively, in other embodiments, a double seam can be formed (see, for example, FIG. 11), in which case the container body can be flanged. The crimp seam 40 has the advantage of being usable with non-flanged container bodies and yet providing a positive locking of the metal end 30 onto the container body 22 even before the metal end is heat-sealed to the container body. This can be seen in FIG. 2, which is a photomicrograph of a sectioned container in the region of the crimp seam 40. A "nub" or interlocking portion of the container body side wall is formed by the folded peripheral edge of the curl "biting" into the side wall. The nub and the folded edge effectively interlock, thereby locking the metal end onto the container body.

It will be understood, of course, that a second metal end is attached to the opposite end of the container body 22 in the same fashion described above. Alternatively, in the case of a container body having an integral bottom wall (as may be the case with, for example, a blow-molded, thermoformed, or injection-molded container body), the second metal end is not required.

The above-described interlocking of the metal end 30 and container body 22 alone, however, is not sufficient to enable the container to withstand a retort process. In order to be able to withstand retort intact, the container is subjected to a heat-sealing operation to fuse portions of the metal end 30 to the container body side wall 24. In this regard, at least one of the respective surfaces of the metal end and side wall that are intimately contacting each other in the region of the crimp seam 40 is formed by a heat-sealable material, and the two surfaces are such that heating of the crimp seam to soften or melt this heat-sealable material, followed by cooling of the material, causes the two surfaces to be "thermally fused" to each other. More specifically, it is important to the attainment of adequate "blow-off resistance" during retort (or other high-internal-pressure condition of the container) that at least the chuck wall 38 of the metal end 30 be thermally fused to the inner surface of the side wall 24 of the container body, and preferably both the chuck wall 38 should be thermally fused at the ID and a portion of the curl 36 (or, more accurately, what was the curl prior to the seaming operation) should be thermally fused at the OD of the container body side wall 24.

Figure 3:
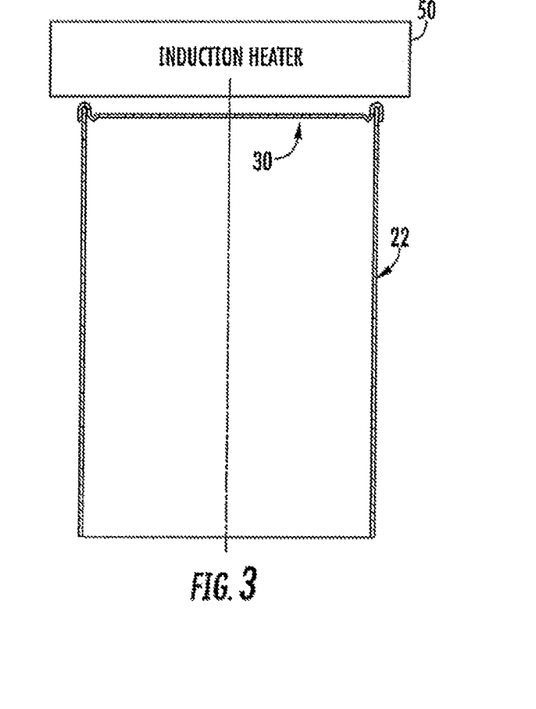
FIG. 3 is a schematic depiction of a further step of the process for making containers, wherein the seamed metal end is induction sealed to the container body, in accordance with an embodiment of the invention.
Figure 4:
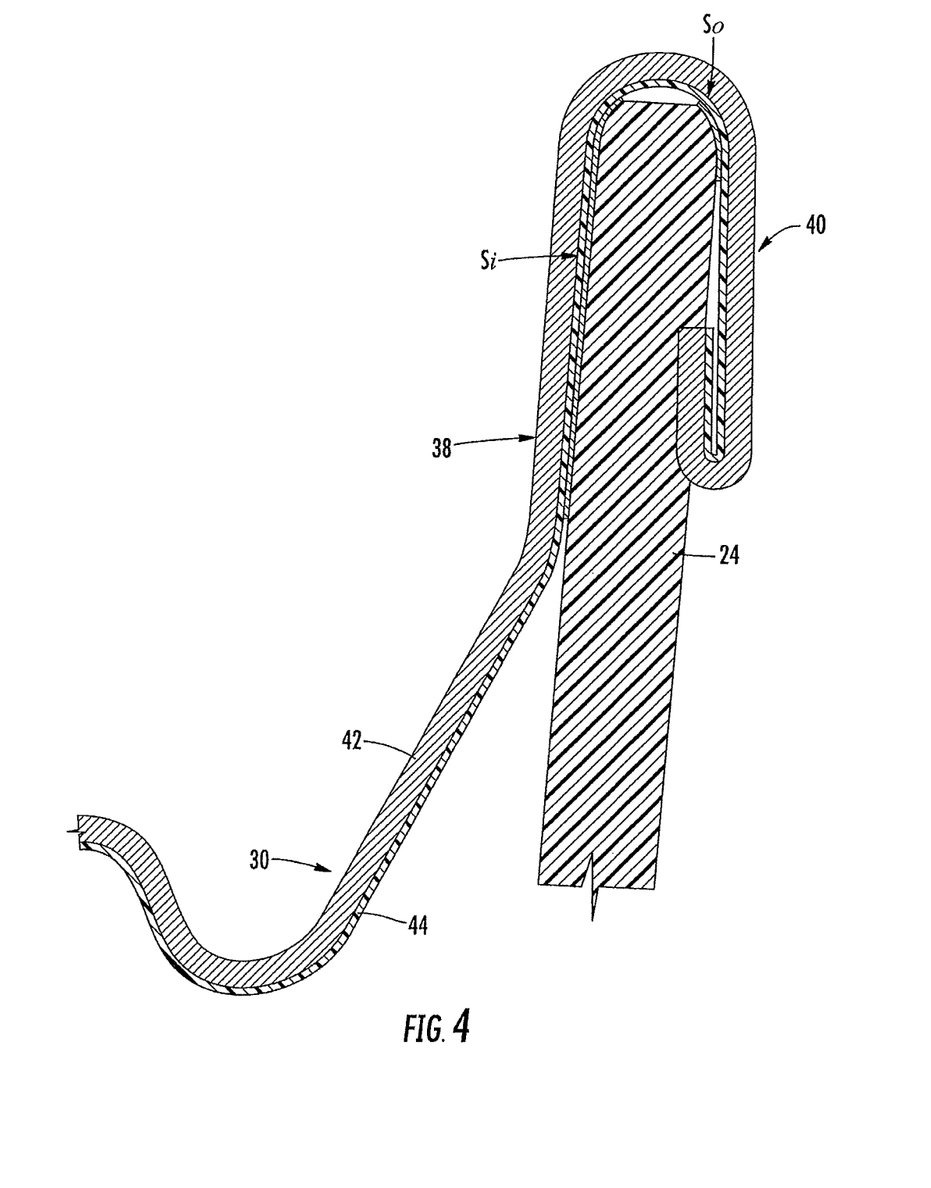
FIG. 4 is a cross-sectional view through the region of the metal end's seam with the container body, after the induction sealing step, in accordance with an embodiment of the invention.

The thermal fusing operation is diagrammatically depicted in FIG. 3, and the resulting thermally fused seam 40 is shown, greatly enlarged, in FIG. 4. As indicated in FIG. 3, the thermal fusing operation can be accomplished using an induction heater 50. The induction heater 50 includes a coil through which a high-frequency alternating current is passed, thereby creating a high-frequency alternating electromagnetic field. The metal layer of the end 30 is exposed to this alternating electromagnetic field, which induces eddy currents (also called Foucault currents) within the metal so as to cause Joule heating because of the resistance of the metal. This heating of the metal then causes heat transfer by conduction to anything in contact with the metal, including the heat-sealable material(s) on the end 30 and/or side wall 24.

Thus, as an example, FIG. 4 illustrates the metal end 30 as having a metal layer 42 and an interior layer or coating of a heat-sealable material 44. Any suitable heat-sealable material can be used for the layer 44, non-limiting examples of which include: acrylonitrile butadiene styrene (ABS), acrylic (PMMA), celluloid, cellulose acetate, cyclic olefin copolymer (COC), ethylene-vinyl acetate (EVA), ethylene vinyl alcohol (EVOH), fluoroplastics (PTFE, alongside with FEP, PFA, CTFE, ECTFE, ETFE), ionomers, liquid crystal polymer (LCP), polyoxymethylene (POM or acetal), polyacrylates (acrylic), polyacrylonitrile (PAN or acrylonitrile), polyamide (PA or Nylon), polyamide-imide (PAT), polyaryletherketone (PAEK or Ketone), polybutadiene (PBD), polybutylene (PB), polybutylene terephthalate (PBT), polycaprolactone (PCL), polychlorotrifluoroethylene (PCTFE), polyethylene naphthalate (PEN), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), styrene-acrylonitrile (SAN). Where the container is to be retort-processed, a suitable heat-sealable material able to withstand the retort-processing conditions should be selected.

When the metal layer 42 is heated by induction heating, the heat-sealable layer 44 is heated by conduction, which causes the heat-sealable material to be softened or melted. Because the electromagnetic field's strength obeys the inverse square law, Joule heating of the metal end is greatest in the parts of the end closest to the coil of the induction heater and decreases proportional to the inverse square of the distance from the coil. Thus, only localized heating of the metal end occurs with a great enough magnitude to cause melting of the heat-sealable layer 44. More particularly, the melting of the heat-sealable layer 44 is confined essentially to the region of the seam 40.

As FIG. 4 indicates, the induction heating of the seam 40, followed by cooling (which occurs rapidly upon cessation of the electromagnetic field or movement of the container away from the coil), results in two areas of thermal fusing between the metal end 30 and container body side wall 24: there is an inner seal $S_i$ between the inner surface of the side wall 24 and a portion of the chuck wall 38 that lies parallel to and intimately contacts the side wall, and there is an outer seal $S_o$ between the outer surface of the side wall 24 and a portion of what was the curl of the metal end prior to seaming. The seals $S_i$ and $S_o$ in FIG. 4 (and in FIGS. 5 and 6) are depicted for illustrative purposes as if they were each a distinct layer between the metal end 30 and the side wall 24, but it is to be understood that in reality the seals are formed by a melding of the heat-sealable layer 44 of the metal end and the thermoplastic material on the surface of the side wall 24 (or, in the case of FIG. 5 where the metal end does not have a heat-sealable layer, by a fusing of the thermoplastic surfaces of the side wall 24 to the metal end).

It is important to the attainment of adequate blow-off resistance that the chuck wall 38 include a portion that is parallel to and intimately contacting the inner surface of the side wall 24, and that this portion be thermally fused as described above. This results in the interface between the chuck wall 38 and the side wall 24 being oriented along a direction substantially parallel to the axis of the container, such that stress on the interface caused by internal pressure inside the container exerted on the metal end 30 is predominantly shear stress in the plane of the interface (as opposed to out-of-plane stress tending to peel one part from the other).

It is also a feature of the present invention that during the heating step for thermally fusing the end 30 to the side wall 24, there is a substantial absence of external pressure exerted on the chuck wall 38 and side wall 24. Rather, pressure between the chuck wall and side wall comes from the interference fit that exists between them, as previously described. Indeed, when an induction heater 50 is employed, it is possible for there to be no contact between the heating element and the metal end (although it may be advantageous or desirable to provide some type of contact with the container, such as for conveying it along a path beneath the induction heating element, when the heating step is carried out in a continuous conveyor-type process).

Various constructions of the metal end 30 and container body side wall 24 can be employed in the practice of the present invention. As noted with respect to FIG. 4, in one embodiment the metal end 30 can have an interior heat-sealable layer 44. In this case, the container body side wall 24 can be a mono-layer construction as illustrated, the substantially thermoplastic side wall 24 being heat-sealable to the heat-sealable layer 44 of the metal end.

Figure 5:
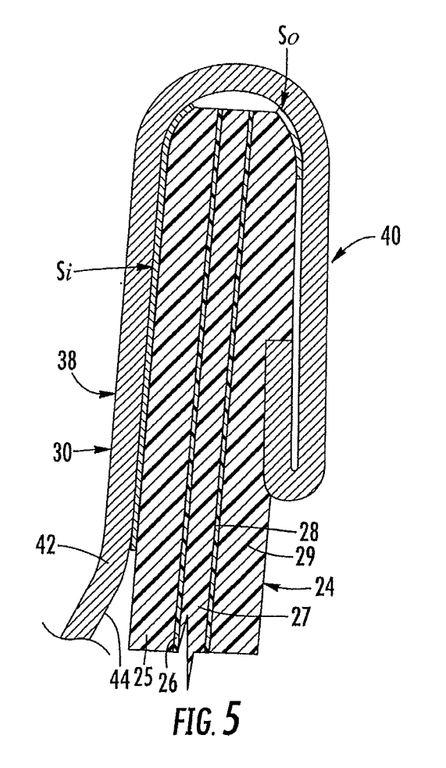
FIG. 5 is a cross-sectional view through the region of the metal end's seam with the container body, after the induction sealing step, in accordance with another embodiment of the invention.

Alternatively, in other embodiments, the side wall 24 can be a multi-layer construction. For example, the side wall 24 can comprise at least two layers including an interior heat-sealable layer and a barrier layer providing moisture and gas barrier properties for the container body. The metal end 30 furthermore does not necessarily have to have an interior heat-sealable layer, as long as the interior surface is fusible to the heat-sealable layer of the side wall 24. FIG. 5 illustrates a possible embodiment along these lines. The metal end 30 does not include an interior heat-sealable layer but rather has a bare metal surface on its interior side. It is illustrated as having a metal layer 42 of homogeneous construction, but it is also possible for the metal end to be, for example, ETP (electrolytic tin plate steel) consisting of a layer of steel to which an ultra-thin coating of tin is electrolytically deposited, for example on the interior product-facing surface. The container body side wall 24 consists of five layers, in order from ID to OD: an interior heat-sealable layer 25, a tie layer 26, a barrier layer 27, a tie layer 28, and an exterior heat-sealable layer 29. Any of the previously described heat-sealable materials can be used for the heat-sealable layers 25 and 29. The barrier layer 27 can comprise any suitable material providing the necessary barrier properties for the particular application to which the container will be put. Non-limiting examples of such barrier materials include ethylene vinyl alcohol (EVOH), polyvinyl alcohol (PVOH), polyvinylidene chloride copolymer (PVDC), polyacrylonitrile (PAN), polyethylene terephthalate (PET), polyethylene naphthalate (PEN), liquid crystal polymers (LCP), amorphous nylon, nylon 6, nylon 66, nylon-MXD6, and the like. The tie layers 26 and 28 can be any suitable adhesive materials for adhering the heat-sealable layers 25 and 29 to the barrier layer 27.

When the metal end 30 does not include a heat-sealable layer, the heat-sealable layers 25 and 29 can be designed to thermally fuse to the bare metal surface so as to form the seals $S_i$ and $S_o$. For example, an ionomer (e.g., SURLYN® or the like) will thermally fuse to a bare metal such as ETP.

An advantage of the seal structure shown in FIG. 5 is that the inner seal $S_i$ and outer seal $S_o$ together serve to isolate the barrier layer 27 of the side wall from moisture migrating either from inside the container or from outside the container and contacting the barrier layer 27. This is important when the barrier layer is a material whose barrier properties are degraded by exposure to moisture. For example, EVOH is an excellent oxygen barrier, but it is well known that EVOH is deleteriously affected by moisture. The usual solution would be to bury the EVOH layer between two layers that are good moisture barriers (e.g., polypropylene). In the container of the present invention, however, this may not completely protect the EVOH layer because the EVOH layer is exposed at the end surface of the container body side wall. If moisture were able to migrate into the seam region, it could then migrate into the EVOH layer through the end surface. The seal structure such as shown in FIG. 5 prevents the end surface of the barrier layer 27 from being exposed to moisture.

Figure 6:
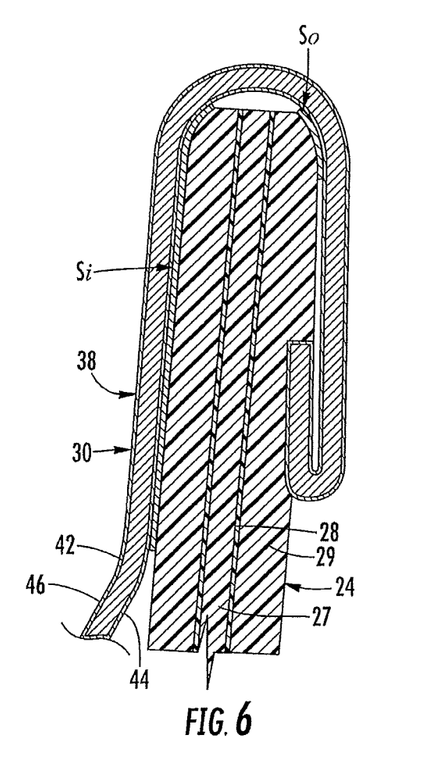
FIG. 6 is a cross-sectional view through the region of the metal end's seam with the container body, after the induction sealing step, in accordance with a further embodiment of the invention.

FIG. 6 shows yet another embodiment, in which the metal end 30 has a metal layer 42, an interior coating 44, and an exterior coating 46. The side wall 24 has a construction similar to that of FIG. 5. The interior coating 44 comprises a heat-sealable material that is compatible with (i.e., heat-sealable to) the interior layer 25 of the side wall 24 to form the seal $S_i$ and with the exterior layer 29 to form the seal $S_o$. The exterior coating 46 is provided primarily for corrosion resistance so that the visible side of the metal end 30 remains aesthetically pleasing and does not develop corrosion that could be a source of contamination upon opening of the container. Any of various coatings can be used on the metal end, such as polyesters, vinyls, acrylics, alkyds, oleoresins, phenolics, and the like.

The above-described embodiments in FIGS. 4 through 6 are not limiting in terms of the particular construction of the metal end 30 and side wall 24. The present invention is applicable to and includes any combination of metal end and side wall constructions in which at least one of their respective surfaces that are intimately contacting each other in the region of the seam 40 is formed by a heat-sealable material, and the two surfaces are such that heating of the seam to soften or melt this heat-sealable material, followed by cooling of the material, causes the two surfaces to be "thermally fused" to each other. Additionally, as previously noted, it is important for at least part of the chuck wall 38 to be parallel to and intimately contacting the side wall 24 so that an interior seal $S_i$ is created that is placed predominantly in shear by internal pressure in the container such as during retort.

Containers in accordance with the present invention were manufactured and were subjected to testing to determine whether the containers would be capable of going through a typical retort process and remaining intact, i.e., with no failure of the metal end-to-side wall seams and with no permanent deformation of the container. The containers had crimp-seamed and induction sealed ends such as shown in FIG. 5, and had the following construction:

Container body inside diameter=3 inches
Container body length=4.4375 inches
Container body side wall structure: PP/tie/EVOH/tie/PP
Side wall thickness=0.035 inch
Metal end structure (from interior to exterior): 40 micron PP/0.0075 inch TFS tin-free steel)/15 micron PET The containers were tested in an apparatus shown schematically in FIG. 7. The apparatus included a closed chamber C for enclosing a container under test. The interior of the chamber was fed with steam via a steam pressure regulator SP and with air via an air pressure regulator AP. The steam and air supplies were regulated so as to maintain a substantially constant 250° F. temperature in the interior of the chamber. A manually operated pressure regulator MPR was used in some of the tests to allow independent control over the air pressure within the test container placed in the chamber. Wireless pressure and temperature transducers (data acquisition/recording devices) were used to measure pressure and temperature within the chamber and pressure within the test container.

Figure 8:
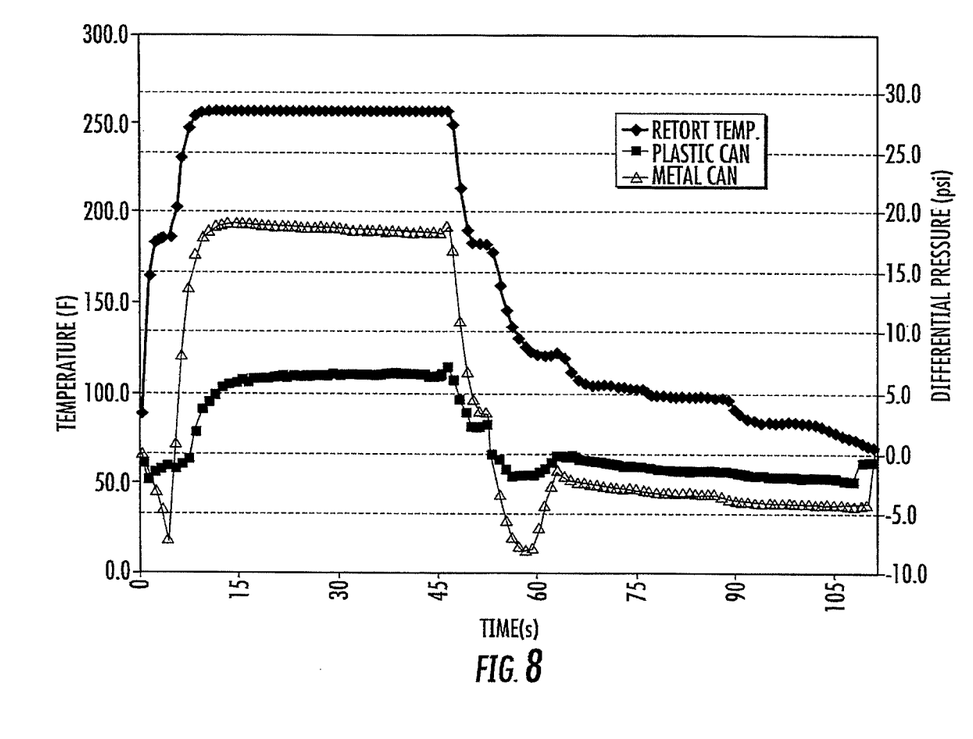
FIG. 8 is a graph of differential pressure (=can pressure−retort pressure) and retort temperature versus time, showing test results for a conventional metal can and for a container in accordance with an embodiment of the invention.

FIG. 8 shows the results of tests of a container in accordance with the invention (substantially as shown in FIG. 5) as well as a conventional metal can having similar overall dimensions and configuration. The objective of this test was to measure the differential pressure (=can internal pressure−chamber internal pressure) experienced by the containers when retorted at a substantially constant 250° F. temperature. In this test series, the manual pressure regulator MPR was not used, but rather the pressure inside the container was allowed to naturally respond to the retort environment in the chamber. The metal container developed a peak differential pressure of about 18.9 psi. In contrast, the container in accordance with the invention developed a peak differential pressure of only about 6.4 psi, nearly one-third of that of the metal container. It is believed that the much lower $\Delta P$ for the plastic-body container was due to the plastic body's ability to expand radially as a result of the internal pressure, which had the effect of reducing the $\Delta P$ relative to that of the relatively rigid metal can.

Figure 9:
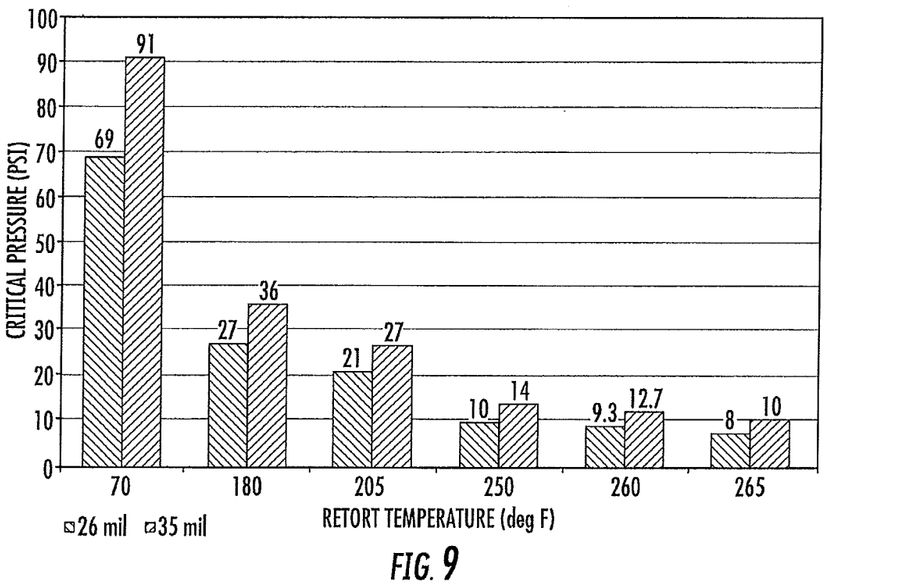
FIG. 9 is a chart of finite element analysis results for a container in accordance with an embodiment of the invention, showing critical pressure (defined as the pressure above which permanent deformation of the container body occurs) as a function of retort temperature.
Figure 10:
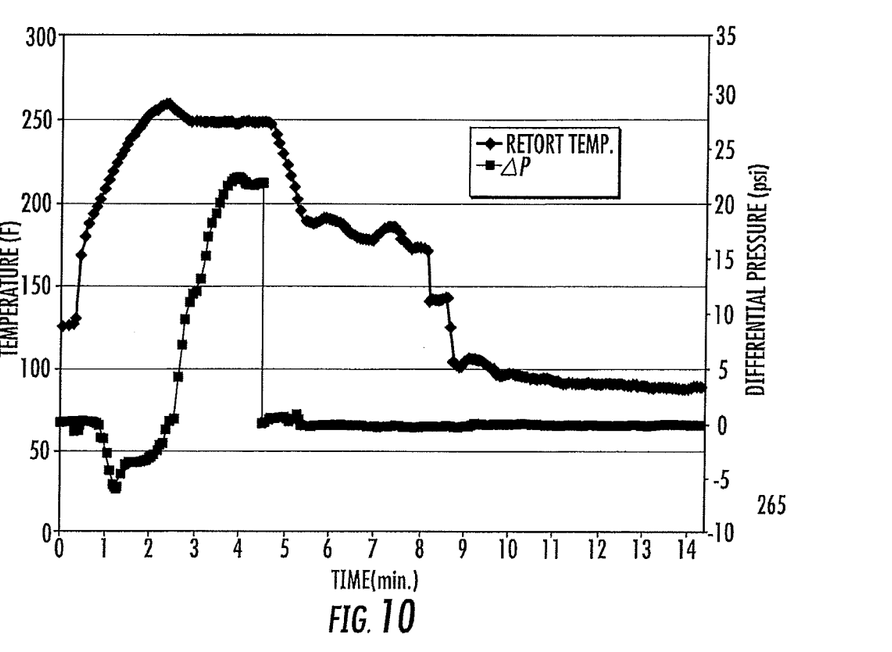
FIG. 10 is a graph of differential pressure and retort temperature versus time, showing test results for a container in accordance with an embodiment of the invention, wherein the differential pressure was allowed to increase until a failure of the container occurred.

This ability to expand is advantageous in terms of reducing the $\Delta P$ and therefore the stress exerted on the seam between the metal end and the plastic container body. However, if the plastic body were to expand too much during retort, it could undergo a permanent deformation, which could render the container unsuitable for its intended purpose. To try to determine whether such permanent deformation could pose a problem, a finite element analysis was performed on the container for two wall thicknesses, 0.026 inch and 0.035 inch, and over a range of temperatures from 70° F. to 265° F. The analysis sought to determine at each temperature the critical pressure, which is defined as the differential pressure above which permanent deformation of the plastic body occurs. The results are plotted in FIG. 9. As expected, the critical pressure decreases with increasing temperature. At a typical retort temperature of 250° F., the critical pressure was computed to be 10 psi for the 0.026 inch wall thickness and 14 psi for the 0.035 inch wall thickness. This analysis provides confidence that under realistic retort conditions such as those in the test summarized in FIG. 8, the $\Delta P$ of the containers of the present invention should be well under the critical pressure.

Figure 7:
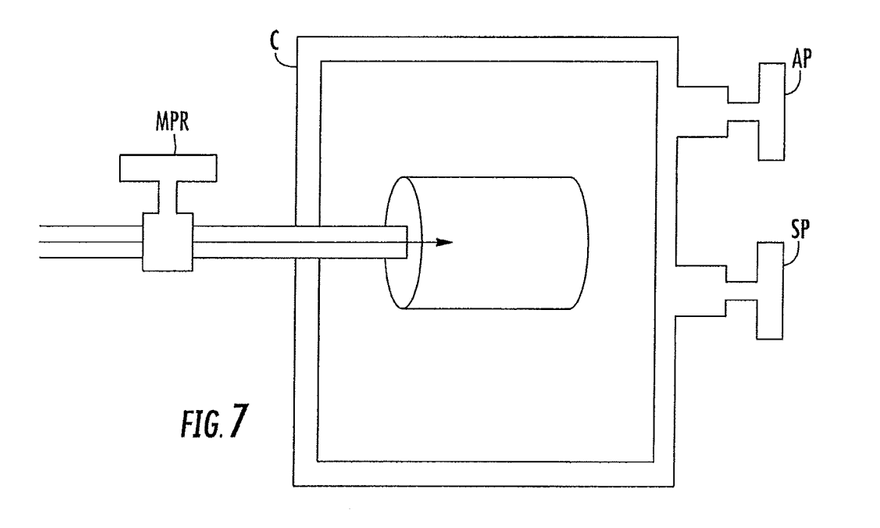
FIG. 7 is a diagrammatic depiction of a test retort apparatus for testing containers made in accordance with embodiments of the invention.

Additional tests of containers with crimp-seamed and sealed ends in accordance with the invention were conducted in the apparatus of FIG. 7 in order to determine how much $\Delta P$ would be required under typical retort conditions to cause the containers to fail. As with the previously described tests, the temperature in the retort chamber was maintained substantially constant at about 250° F. By adjusting the manual pressure regulator MPR periodically, the pressure within the container was stepped up synchronously with the increasing pressure in the test chamber during "come-up". Once the temperature in the chamber reached a controlled 250° F. (having maintained minimal differential pressure to this point), the pressure in the container was then increased progressively until failure occurred, in order to evaluate the seal burst resistance due to positive differential pressure. FIG. 7 shows the temperature and $\Delta P$ versus time for one container. The container failed at a $\Delta P$ of about 21.9 psi, and the failure mode was a bursting of the plastic container body. Additional repeat tests were performed with several other nominally identical containers. Over the series of tests, the $\Delta P$ at failure ranged from 21.8 to 22.4 psi, and the failure mode was always a bursting of the plastic container body wall. The metal ends remained attached to the container body.

For comparison purposes, the same type of test was conducted on containers made from the same container body and metal end components, but having the ends double-seamed onto the container bodies and without induction sealing of the ends. For that series of tests, the $\Delta P$ at failure ranged from 4.4 to 8.3 psi, and the failure mode was always a breach of the double seam of one of the ends (i.e., the double seam "unrolled" as a result of softening of the plastic side wall at elevated temperature and the stress applied to the seam from the internal pressure).

Thus, comparing the performance of the inventive containers with crimp-seamed and sealed ends on the one hand to that of the containers with double-seamed and unsealed ends on the other hand, there was an approximately 250% increase in the $\Delta P$ at failure for the inventive container. This dramatic improvement was unexpected and is not completely understood. It is theorized, however, that the improvement in seam integrity is due in large part to the thermal fusing of the chuck wall to the inner surface of the container body side wall, which results in an interface that experiences almost purely shear stress during a high internal-pressure condition such as retort. This interface, which is very strong in shear, is thought to bear the vast majority of the stress exerted on the metal end, such that the seam itself is not subjected to great stress.

A further advantage of the container of the invention is its ability to undergo elastic expansion during high internal-pressure conditions such as retort, and then return substantially to its original configuration when the high internal pressure is relieved. As noted, this helps alleviate internal pressure and, consequently, the stresses exerted on the chuck wall/side wall interface and the seam. To realize this advantage, of course, the container body must be relatively unconstrained so that it is able to expand radially.

Figure 11:
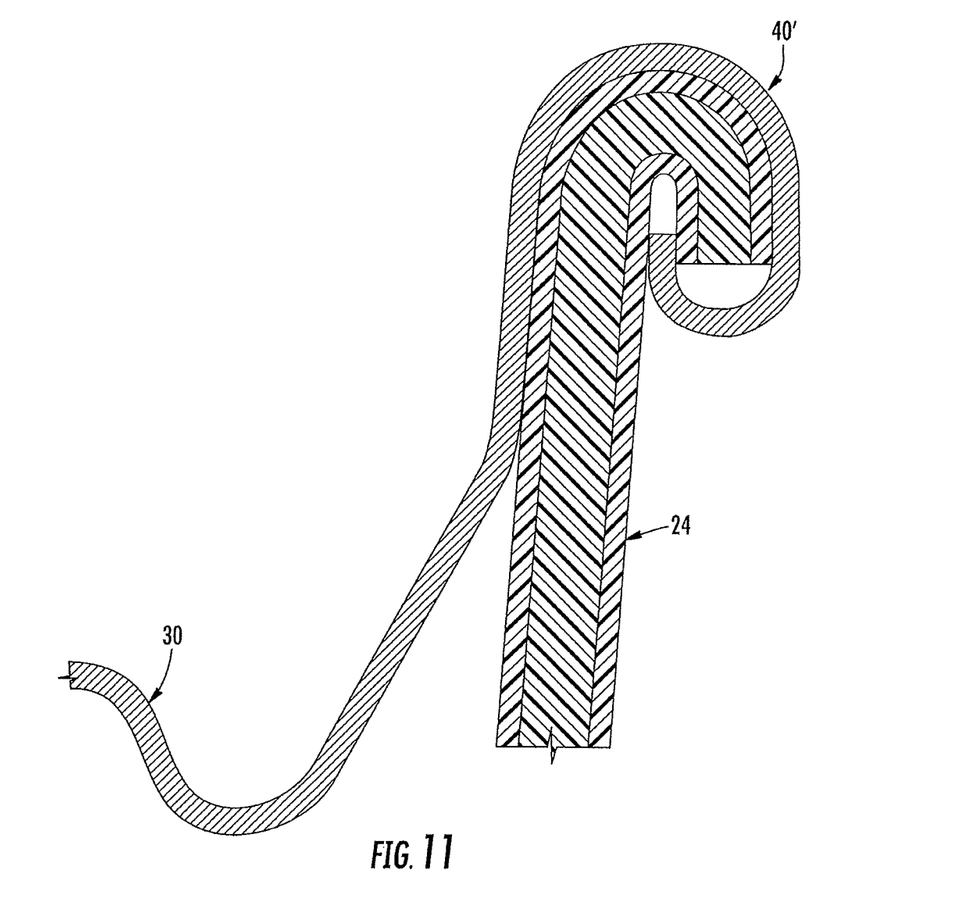
FIG. 11 is a cross-sectional view of a container having a double-seamed and sealed end in accordance with another embodiment of the invention.

The foregoing description focuses on containers having crimp-seamed and sealed metal ends. As noted, however, the invention is not limited to crimp seaming. Alternatively, the metal ends can be double seamed and then sealed via an induction heating or other process. FIG. 11 shows such a container having a double seam 40'. Apart from the different seam configuration, the double-seamed containers are similar to the previously described crimp-seamed containers. The double seam 40' is characterized by the upper end of the side wall 24 forming a body hook and the curl of the metal end forming an end hook that is interlocked with the body hook.

In typical double-seamed containers, a seaming compound is often applied to the metal end in the region of the curl. The seaming compound flows during double seaming so as to fill up any gaps that may exist between the metal end and container body wall in the seam area. Containers in accordance with the invention can be made either with our without conventional seaming compounds.

In the foregoing description and the appended claims, references to the container body being "substantially thermoplastic" or the like mean that thermoplastic is the majority ingredient of the container body on a volume basis, and furthermore that any non-thermoplastic ingredient(s) does (do) not impair the ability of the container body to be heat-sealed to a metal end or to expand elastically during retort processing as previously described. For example, a substantially thermoplastic container body can include non-thermoplastic ingredients such as pigments (e.g., titanium dioxide), dyes, or other additives for imparting visual characteristics (e.g., coloration, opacity, etc.) or other properties not provided by the thermoplastic itself. As another example, a container body of composite construction such as paper/thermoplastic or metal/thermoplastic would not be "substantially thermoplastic" (even if the thermoplastic were the majority ingredient by volume) if the paper or metal component impaired the ability of the container body to be heat-sealed to a metal end and/or to expand elastically during retort processing.

Containers in accordance with the invention can provide distinct advantages over conventional metal retort containers. For example, the invention enables the option of making the container body 22 substantially transparent so that the contents of the container can be seen by the consumer prior to purchase. Particularly for visually attractive products (e.g., fruits and vegetables) this can provide a perception of freshness. Alternatively, the container body can be tinted any of various colors while still remaining substantially transparent, or can be made opaque, through incorporation of suitable dyes or pigments in the thermoplastic material. Additionally, the container can be free of bisphenol-A (BPA). The container can be microwavable, unlike a conventional metal can.

Many modifications and other embodiments of the inventions set forth herein will come to mind to one skilled in the art to which these inventions pertain having the benefit of the teachings presented in the foregoing descriptions and the associated drawings. For example, while induction heating has been described for causing the metal end and container side wall to become thermally fused together in the seam area, other types of heating devices and processes can be used instead. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making a container, comprising the steps of:
    providing a container body having a side wall extending about a container body axis, the side wall having a lower end and an upper end, the upper end defining an upper edge that extends about a top opening of the container body, the side wall having an inner surface and an outer surface;
    providing a metal end for closing the top opening of the container body, the metal end having at least a metal layer and comprising a central portion and an outer peripheral portion extending generally radially outwardly from the central portion and extending circumferentially about the central portion, the peripheral portion having a radially outer part and a radially inner part, a first heat-sealable material being present on one of (a) a lower surface of at least the peripheral portion of the metal end and (b) the inner surface of the side wall adjacent the upper end thereof, the radially outer part of the peripheral portion defining a curl, the radially inner part of the peripheral portion defining a chuck wall that extends generally downward from the curl and has a radially outer surface;
    applying the metal end to the container body such that the metal end closes the top opening and the radially outer surface of the chuck wall and the inner surface of the side wall have an intimately contacting interface therebetween;
    forming a seam connecting the metal end to the upper end of the side wall, the seam being formed by interlocking the curl of the metal end with the upper end of the side wall via a folded peripheral edge of the curl and the side wall;
    after formation of the seam is completed, heating the first heat-sealable material to a temperature sufficient to cause the first heat-sealable material in contact with the radially outer surface of the chuck wall and the inner surface of the side wall to be softened or melted; and
    allowing the first heat-sealable material to cool and harden such that the interface between the chuck wall and the side wall is fused, the interface being oriented along a direction such that stress on the interface caused by internal pressure inside the container exerted on the metal end is predominantly shear stress.

2. The method of claim 1, wherein the step of forming a seam comprises forming a crimp seam.

3. The method of claim 1, further comprising providing a second heat-sealable material present on the other of (a) the lower surface of at least the peripheral portion of the metal end and (b) the inner surface of the side wall adjacent the upper end thereof, and wherein:
    the second heat-sealable material and the first heat-sealable material are placed in contact with each other at the interface between the chuck wall and the side wall, and the first and second heat-sealable materials are heated to a temperature sufficient to cause the first and second heat-sealable materials to be softened or melted and to flow together, after which cooling of the first and second heat-sealable materials is allowed to occur so as to fuse the chuck wall to the inner surface of the side wall.

4. The method of claim 3, wherein the second heat-sealable material and the first heat-sealable material are thermally fused together in the seam as well.

5. The method of claim 1, further comprising the steps of:
    filling the container with a food product prior to the step of applying the metal end to the container body; and
    after the interface between the chuck wall and the side wall is fused, retorting the container.

6. The method of claim 5, wherein during the retorting step the container body is radially unconstrained such that the container body is allowed to expand radially as internal pressure is exerted on the side wall, thereby reducing pressure build-up within the container and consequently the stress placed upon the side wall and metal end.

7. The method of claim 6, wherein the container body is free of any special expansion panels, whereby the radial expansion of the container body occurs substantially uniformly about a circumference of the container body.

8. The method of claim 1, wherein the chuck wall extends at a non-zero acute angle relative to a longitudinal axis of the container body and is configured such that a lower end of the chuck wall is smaller in diameter than the inner surface of the side wall, while an upper end of the chuck wall is larger in diameter than the inner surface of the side wall, and wherein the step of applying the metal end to the container body results in the side wall of the container body moving relatively upward from the lower end to the upper end of the chuck wall such that an interference fit is created between the chuck wall and the side wall, thereby creating said intimately contacting interface therebetween.

9. The method of claim 8, wherein during the heating step there is a substantial absence of external pressure exerted on the chuck wall and side wall, pressure between the chuck wall and side wall coming rather from said interference fit.

10. A method for packaging and retort-processing a food product, comprising the steps of:
providing a container assembly that includes a container body having a side wall and further includes an end wall closing a lower end of the container body, an opposite upper end of the container body being open;
providing a metal end having at least a metal layer and comprising a central portion and an outer peripheral portion extending generally radially outwardly from the central portion and extending circumferentially about the central portion, the peripheral portion having a curl and a chuck wall that extends generally downward and radially inwardly from the curl;
providing at least one heat-sealable material on at least one of (a) a lower surface of the peripheral portion of the metal end and (b) an inner surface of the container body adjacent the upper end thereof;
placing the food product into the container assembly through the open end of the container body;
forming a crimp seam between the metal end onto the container body to close the open end thereof, the forming step causing the side wall of the container body to be compressed between the chuck wall on an inner side of the side wall and a permanently deformed portion of the metal end formed by deforming the curl on an outer side of the side wall;
thermally fusing the metal end to the container body by causing the heat-sealable material(s) to be melted where the metal end compresses the side wall and then allowing the melted heat-sealable material(s) to cool and harden, thereby completing a filled container; and
retort-processing the filled container to sterilize the food product and interior of the container.

11. The method of claim 10, wherein during the retort-processing step the container body is radially unconstrained such that the container body is allowed to expand radially as internal pressure is exerted on the side wall, thereby reducing pressure build-up within the container and consequently the stress placed upon the side wall and metal end.

* * * * *